(12) United States Patent
Yo et al.

(10) Patent No.: US 7,062,832 B2
(45) Date of Patent: Jun. 20, 2006

(54) HIGH-SPEED DRIVING METHOD OF PRESSURE CYLINDER

(75) Inventors: Seikai Yo, Tsukuba-gun (JP); Hiroshi Miyachi, Tsukuba-gun (JP); Nobuhiro Fujiwara, Tsukuba-gun (JP); Daisuke Matsumoto, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 147 days.

(21) Appl. No.: 10/785,014

(22) Filed: Feb. 25, 2004

(65) Prior Publication Data

US 2004/0182231 A1 Sep. 23, 2004

(30) Foreign Application Priority Data

Mar. 20, 2003 (JP) .............................. 2003-078580

(51) Int. Cl.
*B23Q 17/00* (2006.01)

(52) U.S. Cl. .................................. 29/407.08; 29/407.05

(58) Field of Classification Search ............. 29/407.08, 29/407.05, 407.01; 91/361, 407, 404, 390; 219/89
See application file for complete search history.

(56) References Cited

U.S. PATENT DOCUMENTS

| 5,012,722 | A | * | 5/1991 | McCormick .................. 91/361 |
| 5,457,959 | A | | 10/1995 | Langguth et al. |
| 5,857,333 | A | * | 1/1999 | Schmidt et al. ............... 60/469 |
| 6,799,501 | B1 | * | 10/2004 | Yo et al. ...................... 91/361 |
| 2002/0117051 | A1 | | 8/2002 | Yoh et al. |

FOREIGN PATENT DOCUMENTS

| DE | 43 19 022 A1 | 12/1994 |
| DE | 100 21 744 | 11/2001 |
| DE | 102 60 138 | 7/2004 |
| EP | 0 632 202 | 4/1998 |
| GB | 2 203 195 | 10/1988 |

* cited by examiner

*Primary Examiner*—John C. Hong
(74) *Attorney, Agent, or Firm*—Oblon, Spivak, McClelland, Maier & Neustadt, P.C.

(57) ABSTRACT

The invention includes a moving step of moving a piston to a target position by supplying and discharging compressed air to and from pressure chambers on opposite sides of the piston of a pressure cylinder by driving servo valves by a controller, a clamping step of allowing a pressure member at a tip end of a piston rod to touch a workpiece softly in this target position, and a pressing force applying step of pressing the workpiece with the pressure member in a required force.

5 Claims, 4 Drawing Sheets

HIGH-SPEED DRIVING METHOD OF PRESSURE CYLINDER

TECHNICAL FIELD

The present invention relates to high-speed driving system and method of a servo-controlled pressure cylinder used for a spot welding gun and the like.

BACKGROUND ART

Technique to control a piston of a cylinder apparatus having an air cushioning mechanism is disclosed in an official gazette of Japanese Patent Application Laid-open No. 2002-250307 which is a patent document. In this technique, two on-off opened/closed solenoid valves are respectively coupled to a head-side pressure chamber and a rod-side pressure chamber formed to sandwich the piston, a throttle valve and a rapid exhaust valve are connected to the rod-side pressure chamber, and these valves are caused to operate based on pressures of the head-side pressure chamber and the rod-side pressure chamber. The cylinder apparatus has the air cushioning mechanism and the valves and the piston are actuated by using compressed air as a driving source and based on pressure information. Therefore, there is no electrically controlled portion except driving of the solenoid valve and there is an advantage that it is easy to cope with a breakdown and the like. On the other hand, many valves are necessary and the number of parts increases.

As an improvement over this cylinder apparatus, the present inventor has developed a system for controlling compressed air to be supplied to a head-side pressure chamber 101 and a rod-side pressure chamber 102 by using one servo valve 100 instead of the two on-off opened/closed solenoid valves as shown in FIG. 5. In this improved cylinder apparatus, the servo valve 100 functions as a selector valve in pushing out of the piston 103 and performs a positioning function in returning of the piston 103 to thereby stop the piston 103 in a desired midpoint position. Moreover, a valve opening degree can be adjusted by using the servo valve 100 and, as a result, a flow rate can be controlled. Therefore, the piston 103 can smoothly be moved to a predetermined position.

In this improved cylinder apparatus, however, the number of parts is still large because the cylinder apparatus has an air cushioning mechanism and needs to use a throttle valve 104 and a rapid exhaust valve 105 and because a pressure setting unit 106 for supplying compressed air of a predetermined pressure to the servovalve 100 is necessary, though the two solenoid valves have become unnecessary by using the servo valve 100. Although various cylinder apparatus with simple structures using servo valves have been developed, their control mechanisms are not necessarily satisfactory and therefore high-speed and smooth control cannot be obtained.

DISCLOSURE OF THE INVENTION

The present invention has been made to solve the above problems and it is an object of the invention to provide high-speed driving method and system for controlling a cylinder apparatus using a servo valve at high speed and smoothly by using minimum required control devices.

According to the invention, there is provided a high-speed driving method including: a moving step of moving a piston to a target position by supplying and discharging compressed air to and from a head-side pressure chamber and a rod-side pressure chamber on opposite sides of the piston of a pressure cylinder by a head-side servo valve and a rod-side servo valve individually connected to the pressure chambers; a clamping step of bringing a pressure member at a tip end of a piston rod coupled to the piston in contact with a workpiece; and pressing force applying step of pressing the workpiece with the pressure member.

In the moving step, which of a head-side end and a rod-side end of the pressure cylinder the target position is closer is sensed, the pressure chamber on a side of the end far from the target position is pressure-controlled so that a pressure of the pressure chamber is maintained at a set value by the servo valve connected to the pressure chamber, and the pressure chamber on a side of the end close to the target position is positioning-controlled so as to stop the piston in the target position by controlling coming in and out of the compressed air by the servo valve connected to the pressure chamber.

In the clamping step, control for allowing the pressure member to touch the workpiece softly by making an exhaust opening degree of the rod-side servo valve constant is carried out when a distance between the pressure member and the workpiece has become equal to or shorter than a certain distance.

In the pressing force applying step, both the servo valves are controlled so that the pressure of the head-side pressure chamber becomes higher than the pressure of the rod-side pressure chamber by a set value.

According to one embodiment of the invention, in the pressing force applying step, an exhaust side of the rod-side servo valve is fully opened and simultaneously the head-side servo valve is controlled so that a pressure difference between both the pressure chambers becomes equal to the set value.

According to another embodiment of the invention, in the pressing force applying step, an air supply side of the head-side servo valve is fully opened or brought into a certain high-pressure outputting state and simultaneously the rod-side servo valve is controlled so that a pressure difference between both the pressure chambers becomes equal to the set value.

In the invention, criteria by which to judge that the pressure member has come in contact with the workpiece are if an internal pressure of the rod-side pressure chamber is lower than an internal pressure of the head-side pressure chamber and if the pressure member is in a sufficiently close position to the workpiece.

In the invention, the criteria further include if a time which has passed since the piston started moving exceeds a set time.

According to the invention, there is provided a driving system comprising: a pressure cylinder for pressurizing a workpiece with a pressing member at a tip end of a piston rod; a rod-side servo valve and a head-side servo valve which are individually connected to a rod-side pressure chamber and a head-side pressure chamber on opposite sides of a piston coupled to the piston rod and which supply and discharge compressed air to and from the pressure chambers; pressure sensors respectively for detecting pressures of both the pressure chambers; a position sensor for detecting a position of the piston; and a controller for controlling both the servo valves based on outputs from the pressure sensors and the position sensor.

The controller has a movement controlling function for moving the piston to a target position, a clamping controlling function for bringing the pressure member at the tip end of the piston rod in contact with the workpiece, and a pressing force application controlling function for pressing the workpiece with the pressure member. In the movement control of the piston, which of a head-side end and a rod-side end of the pressure cylinder the target position is closer is sensed, the pressure chamber on a side of the end far from the target position is pressure-controlled so that a pressure of the pressure chamber is maintained at a set value by the servo valve connected to the pressure chamber, and the pressure chamber on a side of the end close to the target position is positioning-controlled so as to stop the piston in the target position by controlling coming in and out of the compressed air by the servo valve connected to the pressure chamber. In the clamping control, control for allowing the pressure member to touch the workpiece softly by making an exhaust opening degree of the rod-side servo valve constant is carried out when a distance between the pressure member and the workpiece has become equal to or shorter than a certain distance. In the pressing force application control, both the servo valves are controlled so that the pressure of the head-side pressure chamber becomes higher than the pressure of the rod-side pressure chamber by a set value.

In the invention, in the pressing force application control, the controller controls the rod-side servo valve so that an exhaust side is fully opened and simultaneously controls the head-side servo valve so that a pressure difference between both the pressure chambers becomes equal to the set value.

In the pressing force application control, the controller controls the head-side servo valve so that an air supply side is fully opened or brought into a certain high-pressure outputting state and simultaneously controls the rod-side servo valve so that a pressure difference between both the pressure chambers becomes equal to the set value.

BEST MODE FOR CARRYING OUT THE INVENTION

Figure 1:
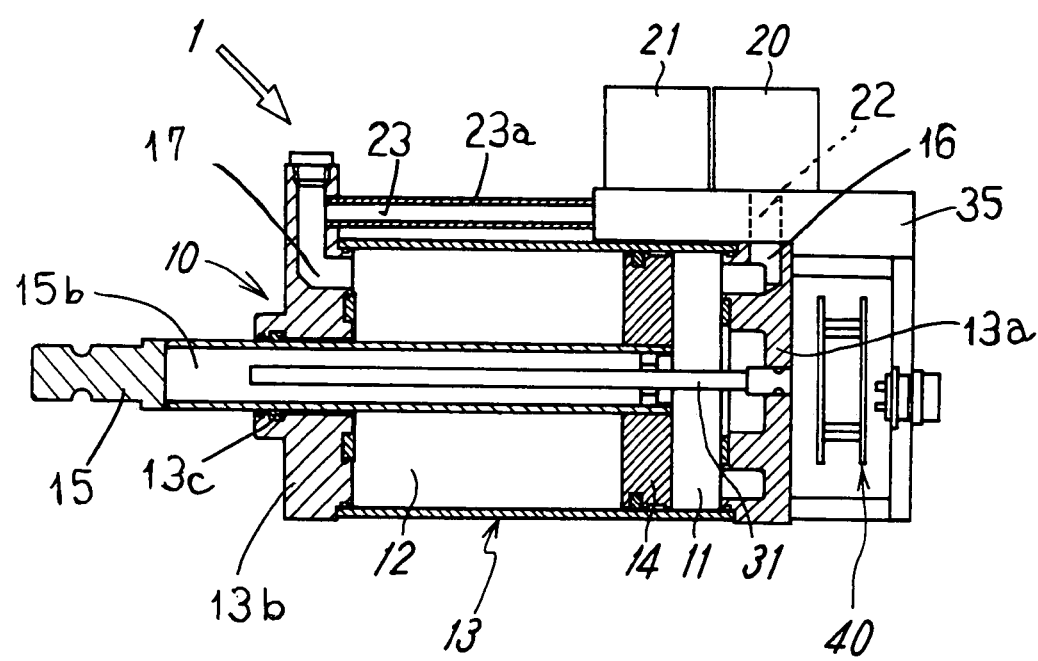
FIG. 1 is a sectional view of a schematic structure of an embodiment of the present invention.

The present invention will be described below in further detail based on an embodiment shown in the drawings. In the present embodiment, the invention is applied to control of a welding gun.

Figure 2:
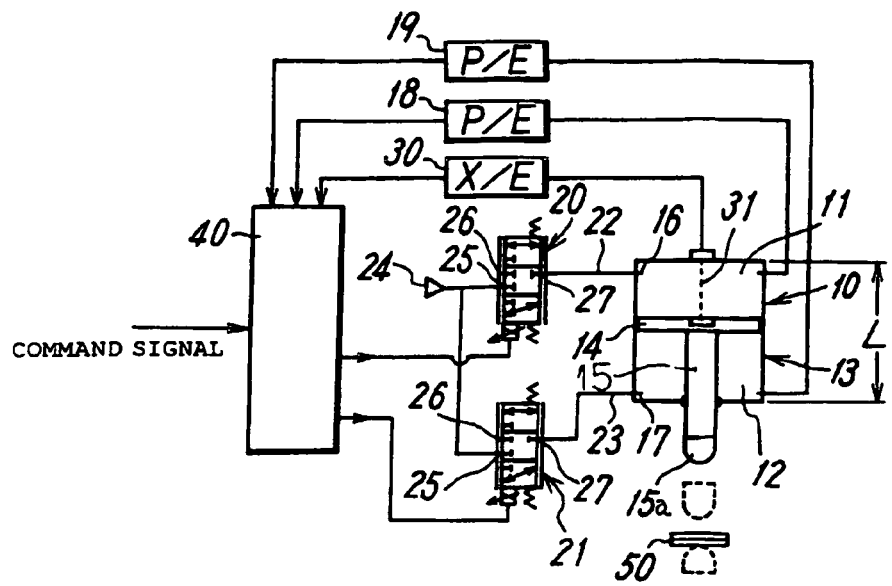
FIG. 2 is a block diagram showing the structure of the embodiment by using symbol marks.
Figure 5:
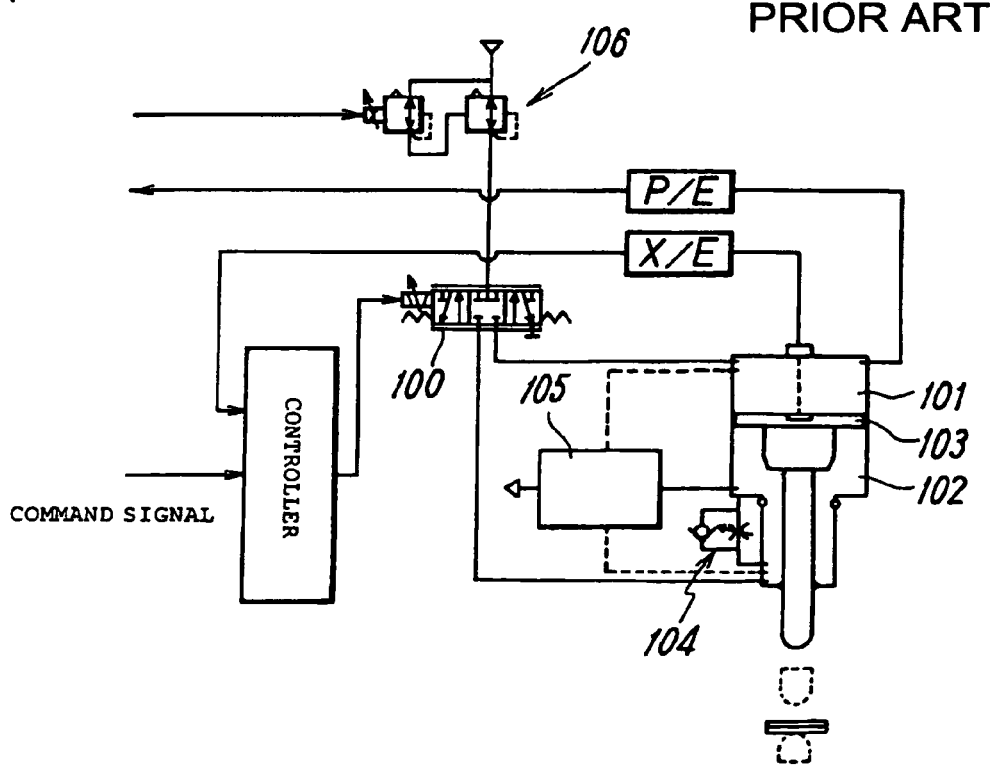
FIG. 5 is a block diagram showing a structure of a prior-art cylinder apparatus by using symbol marks.

A high-speed driving system 1 shown in FIGS. 1 and 2 includes a pressure cylinder 10 forming a welding gun, a head-side servo valve 20 connected between a head-side pressure chamber 11 of the pressure cylinder 10 and a compressed air source 24 to control coming of compressed air into and out of the pressure chamber 11, a rod-side servo valve 21 connected between a rod-side pressure chamber 12 and the compressed air source 24 to control coming of compressed air into and out of the pressure chamber 12, and a controller 40 for outputting control signals to the servo valves 20 and 21.

The pressure cylinder 10 includes a cylinder main body 13 having inside thereof a circular cylinder chamber, a piston 14 mounted for sliding inside the cylinder main body 13, and a piston rod 15 connected to the piston 14 and includes the head-side pressure chamber 11 and the rod-side pressure chamber 12 on opposite sides of the piston 14. An end of the piston rod 15 air tightly passes through a rod-side cover 13b of the cylinder main body 13 with a sealing member 13c disposed between the rod 15 and the cover 13b and extends outside. This end portion extending outside is mounted with a pressure member 15a which forms one of electrode members of the welding gun.

The head-side pressure chamber 11 has an opening 16 in a position close to an end of the chamber 11, i.e., at the head-side cover 13a of the cylinder main body 13, is connected to the head-side servo valve 20 through the opening 16 and a fluid flow path 22, and is also connected to a-head-side pressure sensor 18 for sensing pressure in the pressure chamber 11. Furthermore, a probe 31 of a position sensor 30 for sensing a driven position of the piston 14 is disposed inside the head-side pressure chamber 11 to extend from the head-side cover 13a toward the piston 14 and is inserted into a hollow portion 15b of the piston rod 15. The head-side pressure sensor 18 and the position sensor 30 are respectively connected to the controller 40 and detection values from the respective sensors are output to the controller 40.

On the other hand, the rod-side pressure chamber 12 is connected to the rod-side servo valve 21 through an opening 17 formed in the rod-side cover 13b in a position close to an end of the chamber 12 and through a fluid flow path 23 in a pipe member 23a extending along an outside of the cylinder main body 13 and is also connected to a rod-side pressure sensor 19 for sensing pressure in the pressure chamber 12. The rod-side pressure sensor 19 is connected to the controller 40 and a detection value from the pressure sensor 19 is output to the controller 40.

The head-side servo valve 20 includes a supply port 25 connected to the compressed air source 24, an exhaust port 26, and an output port 27 connected to the fluid flow path 22 and is formed to operate in response to an output signal from the controller 40 to select flow paths between the respective ports and to control a flow path area to thereby control a flow rate. The rod-side servo valve 21 has the same structure and function as the head-side servo valve 20 and is connected to the rod-side pressure chamber 12. Therefore, the respective ports are provided with the same reference numerals as those of the head-side servo valve 20 to omit description of the ports. These servo valves 20 and 21 are directly mounted to the pressure cylinder 10 through a mounting member 35 together with the controller 40.

A microprocessor is mounted in the controller 40 and detection values are input to the controller 40 respectively from the head-side pressure sensor 18, the rod-side pressure sensor 19, and the position sensor 30. In this controller 40, set values for determining an operation mode of the piston 14, a clamping position where the electrode member comes in contact with a workpiece 50 in welding, a midpoint stop position to which the electrode member recedes from the workpiece 50, and the like are stored. Based on command signals such as "move", "stop at midpoint", "clamp", and "apply pressing force" input from a main computer (not shown), the detection values and the set values are compared in the controller 40 and driving signals are output to the head-side servo valve 20 and the rod-side servo valve 21 to thereby achieve a predetermined operation of the pressure cylinder 10.

Here, the above command signal, "move" refers to movement of the piston 14 to a target position such as the clamping position and the midpoint stop position, "stop at midpoint" refers to stopping of the piston 14 in such a position as to stop the electrode member 15a in a position at a certain distance from the workpiece 50 before welding starts, during a welding process, or after the welding has finished, "clamp" refers to retaining of the electrode member 15a in contact with the workpiece 50 in welding, and "apply pressing force" refers to pressing of the workpiece 50 by the electrode member 15a with a certain set pressing force in welding.

Next, a function of the controller and a method of controlling the welding gun by the controller will be described.

[1] Basic Operation Control

In a moving process for moving the piston 14 to the clamping position or the midpoint stop position which are the target positions, the head-side servo valve 20 and the rod-side servo valve 21 are controlled by the controller 40 and compressed air is supplied to and discharged from the head-side pressure chamber 11 and the rod-side pressure chamber 12 to thereby carry out pressure control and positioning control by the servo valves 20 and 21. The "pressure control" refers to control for maintaining an internal pressure of the pressure chamber at a set pressure by the servo valve and the "positioning control" refers to control for moving the piston 14 to the target position and stopping it there by controlling coming of the compressed air into and out of the pressure chamber by the servo valve.

In this moving process, in order to allow the piston 14 to arrive the set target position Xr quickly, the controller 40 senses which of a head-side end and a rod-side end of the pressure cylinder 10 the target position Xr is closer, the pressure chamber on a side of the end close to the target position is positioning-controlled by the servo valve connected to the pressure chamber, and the pressure chamber on a side of the far end is pressure-controlled by the servo valve connected to the pressure chamber. In other words, this is substantially equal to carrying out the positioning control for the pressure chamber having a smaller capacity and carrying out the pressure control for the pressure chamber having a larger capacity when the piston 14 has arrived at the target position Xr.

Which of the head-side end and the rod-side end of the pressure cylinder 10 the target position Xr is closer may be detected by judging on which of the head side and the rod side of a center position L/2 of an axial length L of the pressure cylinder 10 the target position Xr is. This judgment can be made by comparing a distance from one end (e.g., head-side end) of the pressure cylinder 10 as a base point to the target position Xr with L/2 (Xr>L/2 or Xr<L/2).

It is also possible to properly use the pressure control or the positioning control based not only on which of the head-side end and the rod-side end the target position Xr is closer as described above but also on how close the target position Xr is to the end, i.e., if the target position Xr is sufficiently close to the end (Xr>>L/2 or Xr<<L/2). A standard of proximity is different depending on various conditions but is normally equal to or shorter than L/8 from the head-side end or the rod-side end. If the target position is out of this range, the servo valve on any side may be pressure-controlled or position-controlled.

A reason for carrying out the different controls depending on which of the head-side end and the rod-side end the target position Xr is closer as described above, i.e., a reason for carrying out not the pressure control but the positioning control for the pressure chamber with the smaller capacity is that a time constant of response to the pressure control varies according to the capacity if the piston 14 moves and the capacity of the pressure chamber varies. Especially when the capacity reduces, the time constant becomes extremely small and the pressure chamber becomes more liable to be affected by the pressure control, which may cause oscillation in a pressure control system.

In the following description, the head-side end where the piston 14 is positioned is a position of zero piston displacement and the rod-side end where the piston 14 is positioned is a position of the maximum piston displacement.

[1-1] Control Method when the Target Position Xr is Closer to the Rod-side End (Xr>L/2 or Xr>>L/2)

This control method is normally applied to a case of driving the piston 14 to the clamping position. In response to the signals from the controller 40, the head-side servo valve 20 pressure-controls the pressure cylinder 10 so that the internal pressure of the head-side pressure chamber 11 becomes a certain pressure required to drive the piston and the rod-side servo valve 21 positioning-controls the pressure cylinder 10 so as to stop the piston 14 in the target position Xr.

To put it concretely, in the controller 40, a set pressure of the head-side pressure chamber 11 and a measured pressure input from the head-side pressure sensor 18 are compared with each other and a control signal is output to the head-side servo valve 20 so that a difference between the pressures becomes zero. Then, in this head-side servo valve 20, the flow paths are opened or closed based on the control signal and the compressed air is supplied to or discharged from the head-side pressure chamber 11 to thereby carry out the pressure control to maintain the internal pressure of the head-side pressure chamber 11 at the set pressure. At the same time, in the controller 40, the target position Xr of the piston 14 and a measured position input from the position sensor 30 are compared with each other and a control signal is output to the rod-side servovalve 21 so that a difference between the positions becomes zero. Then, in the rod-side servo valve 21, the flow paths are opened and closed based on the control signal and the compressed air is supplied to or discharged from the rod-side pressure chamber 12 to thereby carry out the positioning control to stop the piston 14 in the target position Xr.

[1-2] Control Method when the Target Position Xr is Closer to the Head-side End (Xr<L/2 or Xr<<L/2)

This control method is mainly used in a case of returning the piston 14 positioned in the clamping position to a midpoint stop position. In this method, the controller 40, the head-side servo valve 20, and the rod-side servo valve 21 respectively carry out similar controls to the case of the above [1-1], though the relationships are reversed. In other words, the rod-side servo valve 21 carries out the pressure control so as to maintain a pressure of the rod-side pressure chamber 12 at a set pressure and the head-side servo valve 20 carries out the positioning control by controlling the compressed air of the head-side pressure chamber 11 so as to stop the piston 14 in the target position Xr. In this case, an air supply side of the rod-side servo valve 21 may be fully open. In this manner, the "stop at midpoint" stably and in a short time can be achieved.

[2] Achievement of Soft Touch During "Clamping" Operation

In the spot welding by using the welding gun, the electrode member 15a in a position at a distance from the workpiece 50 is first moved at high speed to a position close to the workpiece 50 by the [1-1] control and then is allowed to touch the workpiece 50 softly so as not to cause an impact. Here, a series of procedure of the "clamping" will be described.

Based on the command output from the main computer to the controller 40, the piston 14 is driven by the [1-1] control and the electrode member 15a is driven from the midpoint stop position or the like at a distance from the workpiece 50 toward the target position Xc in clamping. Meanwhile, in the controller 40, a position signal (X) input from the position sensor 30 and the target position Xc are compared with each other. When the piston 14 has moved to such a position that a difference between the positions becomes equal to or smaller than a certain value $\delta$ (Xc−X≦$\delta$), the controller 40 outputs a control signal for retaining an exhaust opening degree of the rod-side servo valve 21 at a minute constant value to the servo valve 21. As a result, the servo valve 21 gradually exhausts the compressed air from the rod-side pressure chamber 12. In this manner, the piston 14 is decelerated so that the electrode member 15a touches the workpiece 50 softly.

One of the reasons for making the exhaust opening degree of the rod-side servo valve 21 constant when the difference between the piston position X and the target position Xc becomes equal to or smaller than the certain value $\delta$ is that the electrode member 15a may stop before the workpiece 50 in some cases by the positioning control by both the servo valves 20 and 21 only. Another reason is that if the electrode member 15a has come in contact with the workpiece 50 is judged based on inversion of the pressure Ph of the head-side pressure chamber 11 and the pressure Pr of the rod-side pressure chamber 12 (Ph>Pr) and it may take a long time to achieve this inversion or the inversion may not occur if the above exhaust opening degree is not secured.

[3] Achievement of the "Application of Pressing Rorce"

In the spot welding with the welding gun, the electrode member 15a and the workpiece 50 are pressurized and energized to thereby carry out the spot welding. A series of procedure of the "application of pressing force" for obtaining this pressurized state will be described.

There are at least the two following methods of carrying out the "application of pressing force" in a state in which the electrode member 15a and the workpiece 50 are kept in contact with each other by the above "clamping" and at a command of the main computer which has recognized the clamping state or under control of the controller 40 itself.

[3-1] Control Method Focused on the Head-side Servo Valve

A control signal for fully opening the exhaust port 26 of the rod-side servo valve 21 is output from the controller 40 to the servo valve 21. At the same time, a pressure difference (Ph−Pr) between the pressure Ph of the head-side pressure chamber 11 and the pressure Pr of the rod-side pressure chamber 12 is obtained based on measured pressures from the head-side and rod-side pressure sensors 18 and 19 and is compared with a set value Pb set in advance and output from the head-side servo valve 20 is controlled so that the pressure difference becomes equal to the set value Pb. As the exhaust port 26 is fully opened, the rod-side pressure chamber 12 is brought into a non-pressure state and the head-side servo valve 20 supplies or discharges a required amount of compressed air to or from the head-side pressure chamber 11 to thereby maintain the set value Pb.

[3-2] Control Method Focused on the Rod-side Servo Valve

A control signal for fully opening the air supply port 27 of the head-side servo valve 20 is output from the controller 40 to the servo valve 20. At the same time, the pressure difference (Ph−Pr) between the pressure Ph of the head-side pressure chamber 11 and the pressure Pr of the rod-side pressure chamber 12 is obtained based on the measured pressures from the head-side and rod-side pressure sensors 18 and 19 and is compared with the set value Pb set in advance and output from the rod-side servo valve 21 is controlled so that the pressure difference becomes equal to the set value Pb. As the air supply port 27 is fully opened, pressure of the head-side pressure chamber 11 is made constant and the rod-side servo valve 21 supplies or discharges a required amount of compressed air to or from the rod-side pressure chamber 12 to thereby maintain the set value Pb.

Although the air supply port 27 of the head-side servo valve 20 is fully opened in the above control, it is also possible to set it in a certain high-pressure outputting state.

If the electrode member 15a has come in contact with the workpiece 50 can be judged by the controller 40 based at least on pressure relationships in which the pressure Ph of the head-side pressure chamber 11 and the pressure Pr of the rod-side pressure chamber 12 are inversed temporarily (Ph<Pr) and then are ultimately inversed again (Ph>Pr). However, it is preferable to make a judgement based on if the electrode member 15a is in a position sufficiently close (e.g., at a distance of 1 mm or closer) to the workpiece 50 in addition to if the pressure Pr is lower than the pressure Ph as described above. It is more preferable to additionally employ if a certain time (e.g., 70 ms) has passed since the "clamping" command was output by utilizing a timer possessed by the controller 40 as one of criteria for the judgment.

In carrying out driving control of the pressure cylinder for the welding gun by using the above-described controller 40, a command for starting clamping operation is first output from the main computer to the controller 40 in a state in which the piston 14 is retained in an initial position. Based on this command, the controller 40 carries out supply or discharge of the compressed air to or from the head-side pressure chamber 11 and the rod-side pressure chamber 12 by the control described in the above [1-1] and the piston 14 moves toward the target position Xr and stops in such a position that the electrode member 15a is close to the workpiece 50. Then, by the control in the above [2], the electrode member 15a is allowed to softly touch the workpiece 50. Then, by the method in the above [3-1] or [3-2], the pressing force is applied to the workpiece to weld the workpiece. Then, the piston 14 is returned to the midpoint stop position by the control method in the above [1-2], welding is repeated in response to commands from the main computer, and the electrode member 15a finally returns to the initial position.

Figure 3:
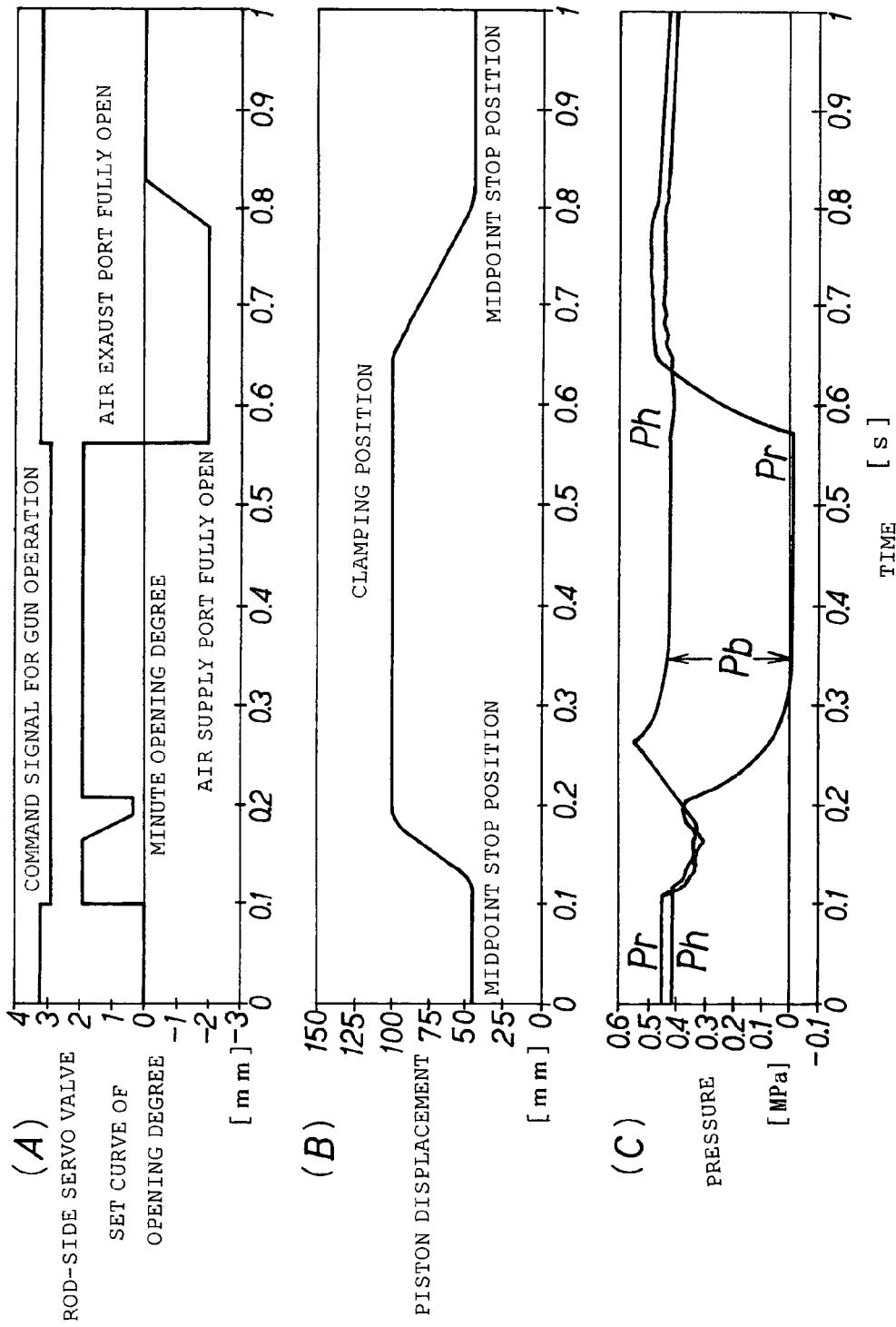
FIGS. 3A to 3C are schematic explanatory diagrams for explaining an example of operation of the embodiment.

FIG. 3 is for explaining a set curve of the opening degree of the rod-side servo valve 21, a piston displacement, and pressure variations of the head-side pressure chamber 11 and the rod-side pressure chamber 12 in a process of operation of the welding gun when the application of the pressing force is carried out by the control in the above [3-1]. Based on this, the control method of the welding gun will be described further concretely.

These operation curves are for a cylinder stroke of 150 mm, a welding stroke of 55 mm, an unused rod end stroke of 50 mm, a pressing force set value of 0.4 MPa, and a supply pressure of 0.6 MPa. As shown in FIG. 3A, because the target position of the piston 14 for welding is on a rod side of a position of a half of a cylinder length, the controller 40 controls the head-side servovalve 20 so that the pressure of head-side pressure chamber 11 becomes constant and the rod-side pressure chamber 12 is positioning-controlled by the rod-side servo valve 21 so that the piston 14 goes toward the target position Xr in clamping operation. In this moving process, the piston 14 moves toward the target position substantially at a constant speed as shown in FIG. 3B while internal pressures of the head-side and rod-side pressure chambers normally vary in complicated manners as shown in FIG. 3C. Then, the above control is continued until a distance between the pressure member and the workpiece 50 becomes equal to or shorter than a certain infinitesimal value δ (here, δ=2 mm). When the position sensor 30 detects that the distance is in this range, the exhaust opening degree of the rod-side servo valve 21 is set at a minute opening degree as shown in FIG. 3A to thereby decelerate the piston 14 as can be seen from FIG. 3B, allow the electrode member 15a to touch the workpiece 50 softly, and complete clamping. A time which has passed up to now is about 0.1 second.

The completion of the clamping operation is detected by recognizing that a relationship between the pressure Ph and the pressure Pr is Ph>Pr based on outputs from the pressure sensors 18 and 19 and that the electrode member 15a is sufficiently close to the workpiece 50 by the position sensor 30. After this recognition, the pressing force is applied by the electrode member 15a.

In this pressing force applying process, the exhaust side of the rod-side servo valve is first fully opened. As a result, as shown in FIG. 3C, the pressure Pr of the rod-side pressure chamber 12 rapidly reduces and converges to 0 MPa. At the same time, based on the outputs from the head-side and rod-side pressure sensors 18 and 19, the head-side servo valve 20 is controlled so that a pressure difference between the head-side and rod-side pressure chambers 11 and 12 becomes 0.4 MPa which is a set value (Pb) of the pressing force. As a result, as shown in FIG. 3C, pressure control is carried out so as to maintain the pressure difference at a constant value. While keeping this state, the spot welding is carried out. Then, the piston 14 is returned to the midpoint stop position. In this case, because the piston driving target position which is the midpoint stop position is closer to the head side than to the central position of the cylinder, the rod-side pressure chamber 12 is pressure-controlled (here, the air supply side is fully opened) by the rod-side servo valve 21 and the head-side servo valve 20 carries out the positioning control simultaneously to return the piston 14 to the midpoint stop position.

Figure 4:
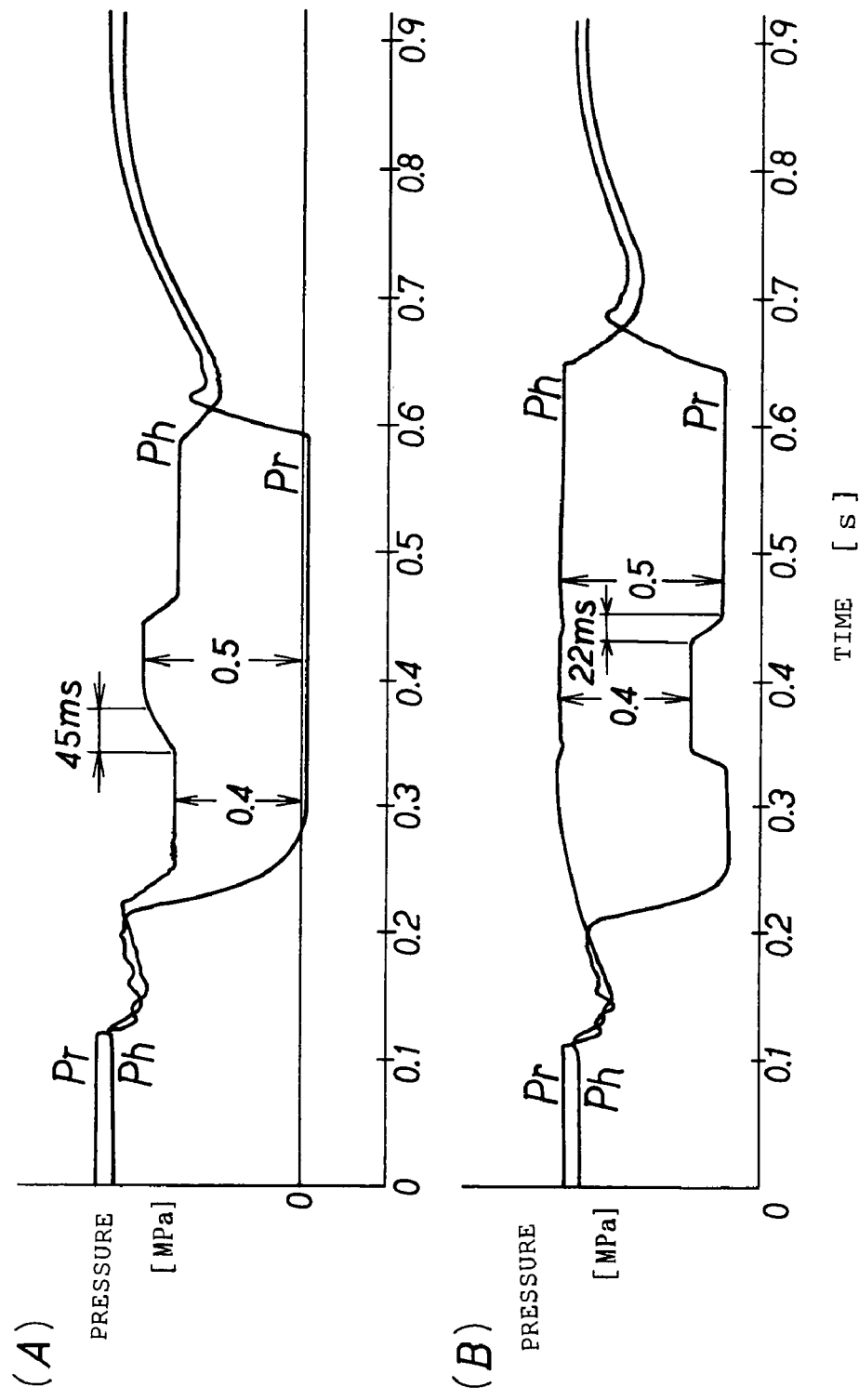
FIGS. 4A and 4B are graphs of experiment examples and showing variations in internal pressures of pressure chambers when different methods of controlling pressing forces are used.

FIG. 4 shows similar experiment examples to the graphs regarding the pressures in FIG. 3C out of the operation curves in FIG. 3. To put it concretely, FIG. 4 shows variations in the pressure Ph of the head-side pressure chamber 11 and the pressure Pr of the rod-side pressure chamber 12 over time when control is carried out by using the pressure cylinder. While FIG. 4A is the graph in a case of using the control method (the pressing force control on the head side) described in [3-1], FIG. 4B is the graph in a case of the control method (the pressing force control on the rod side) described in [3-2]. The pressing force may be changed during the welding process in some cases in the spot welding and the pressing force is changed in both cases in FIG. 4A and FIG. 4B.

Next, by reference to FIG. 4A and FIG. 4B, advantages and disadvantages of the control methods [3-1] and [3-2] of the "application of the pressing force" will be described.

In FIG. 4A, the pressing force in the "application of the pressing force" is changed. This change is increase in the pressure Ph of the head-side pressure chamber 11 by 0.1 MPa and a response time required at this time is 45 ms.

On the other hand, the pressing force is changed similarly in FIG. 4B. These changes are achieved by increase and reduction in the pressure Pr of the rod-side pressure chamber 12 by 0.1 MPa and a required response time corresponding to the above 45 ms in FIG. 4A is 22 ms.

In other words, if the pressing forces are changed in both cases, the response time in FIG. 4B in which the rod-side pressure chamber 12 having the smaller pressure chamber capacity is pressure-controlled is much shorter. However, this case requires a faster-response and higher-performance valve than the control method in [3-1].

Although gains of the control signals in the above-described "stop at midpoint" and "application of the pressing force" have not especially been described, the gain of the pressure control at the time of the "stop at midpoint" is preferably lower than the gain of the pressure control at the time of the "application of the pressing force". If both gains are equal to each other, the piston may be vibrated in its stop operation at the time of the "stop at midpoint".

Although the invention has been described up to this point based on the embodiment, the invention is not limited to the embodiment and may take various forms without departing from scope of the claims.

According to the high-speed driving method and system of the pressure cylinder of the invention described above, the pressure cylinder can smoothly be controlled at high speed with the simple structure.

The invention claimed is:

1. A high-speed driving method of a pressure cylinder including: a moving step of moving a piston to a target position by supplying and discharging compressed air to and from a head-side pressure chamber and a rod-side pressure chamber on opposite sides of the piston of the pressure cylinder by a head-side servo valve and a rod-side servo valve individually connected to the pressure chambers; a clamping step of bringing a pressure member at a tip end of a piston rod coupled to the piston in contact with a workpiece; and a pressing force applying step of pressing the workpiece with the pressure member, wherein, in the moving step, which of a head-side end and a rod-side end of the pressure cylinder the target position is closer is sensed, the pressure chamber on a side of the end far from the target position is pressure-controlled so that a pressure of the pressure chamber is maintained at a set value by the servo valve connected to the pressure chamber, and the pressure chamber on a side of the end close to the target position is positioning-controlled so as to stop the piston in the target position by controlling coming in and out of the compressed air by the servo valve connected to the pressure chamber, in the clamping step, control for allowing the pressure member to touch the workpiece softly by making an exhaust opening degree of the rod-side servo valve constant is carried out when a distance between the pressure member and the workpiece has become equal to or shorter than a certain distance, and in the pressing force applying step, both servo valves are controlled so that the pressure of the head-side pressure chamber becomes higher than the pressure of the rod-side pressure chamber by a set value.

2. A method according to claim 1, wherein, in the pressing force applying step, an exhaust side of the rod-side servo valve is fully opened and simultaneously the head-side servo valve is controlled so that a pressure difference between both pressure chambers becomes equal to the set value.

3. A method according to claim 1, wherein, in the pressing force applying step, an air supply side of the head-side servo valve is fully opened or brought into a certain high-pressure outputting state and simultaneously the rod-side servo valve is controlled so that a pressure difference between both pressure chambers becomes equal to the set value.

4. A method according to any one of claims 1 to 3, wherein criteria by which to judge that the pressure member has come in contact with the workpiece are if an internal pressure of the rod-side pressure chamber is lower than an internal pressure of the head-side pressure chamber and if the pressure member is in a sufficiently close position to the workpiece.

5. A method according to claim 4, wherein the criteria includes if a time which has passed since the piston started moving exceeds a set time.

* * * * *